(12) United States Patent
Fleytman et al.

(10) Patent No.: US 6,835,154 B2
(45) Date of Patent: *Dec. 28, 2004

(54) ON-DEMAND TRANSFER CASE

(75) Inventors: Yakov Fleytman, Orion, MI (US); Carl D. Schleuder, Novi, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,171

(22) Filed: Sep. 19, 2003

(65) Prior Publication Data

US 2004/0092355 A1 May 13, 2004

Related U.S. Application Data

(63) Continuation of application No. 09/689,401, filed on Oct. 12, 2000, now Pat. No. 6,645,112.
(60) Provisional application No. 60/159,893, filed on Oct. 15, 1999.

(51) Int. Cl.[7] .............................................. F16H 48/06
(52) U.S. Cl. ........................ 475/210; 475/228; 475/230
(58) Field of Search ................................ 475/228, 230; 74/425.5; 180/248–251

(56) References Cited

U.S. PATENT DOCUMENTS

| | | | |
|---|---|---|---|
| 548,860 A | 10/1895 | Ames | |
| 1,903,318 A | 4/1933 | Wildhaber | |
| 1,980,237 A | 11/1934 | Trbojevich | |
| 3,220,284 A | 11/1965 | Horvath | |
| 3,535,948 A | 10/1970 | Winzeler | |
| 3,597,990 A | 8/1971 | McCartin | |
| 3,711,910 A | 1/1973 | Strejc | |
| 3,875,635 A | 4/1975 | Pavlov et al. | |
| 3,895,700 A | 7/1975 | Kerr | |
| 3,977,632 A | 8/1976 | Walson | |
| 4,047,449 A | 9/1977 | Popov | |
| 4,489,625 A | 12/1984 | White | |
| 4,632,337 A | 12/1986 | Moore | |
| 4,685,346 A | 8/1987 | Brackett | |
| 4,697,476 A | 10/1987 | Maxwell | |
| 4,783,023 A | 11/1988 | Jupe | |
| 4,813,297 A | 3/1989 | Azuma et al. | |
| 4,819,512 A | 4/1989 | Azuma et al. | |
| 4,907,672 A | 3/1990 | Muzzarelli | |
| 4,973,295 A | 11/1990 | Lee | |
| 4,998,385 A | 3/1991 | Umezono et al. | |
| 5,006,101 A | 4/1991 | Truong | |
| 5,015,898 A | 5/1991 | Frey | |
| 5,018,403 A | 5/1991 | Umezono et al. | |

(List continued on next page.)

FOREIGN PATENT DOCUMENTS

| | | |
|---|---|---|
| DE | 2415859 | 10/1975 |
| DE | 3435219 A1 | 5/1985 |
| DE | 3428865 C1 | 9/1985 |
| FR | 2341787 | 9/1977 |

*Primary Examiner*—Tisha Lewis
(74) *Attorney, Agent, or Firm*—Harness, Dickey & Pierce P.L.C.

(57) ABSTRACT

A torque transfer system is disclosed which is particularly well-suited for use in four-wheel drive transfer cases to establish distinct two-wheel and four-wheel drive modes as well as providing an automatic ("on-demand") four-wheel drive mode. The torque through system includes a planetary gearset having a first component driven by an input member, a second component driving an output member, and a third component driven by a worm gearset. The worm gearset includes a worm gear fixed for rotation with the third component and a worm meshed with the worm gear. A variable speed motor drives the worm for varying the speed ratio between the first and third components of the planetary gearset, thereby causing a corresponding variation in the drive torque transferred from the input member to the output member.

17 Claims, 16 Drawing Sheets

U.S. PATENT DOCUMENTS

| | | | |
|---|---|---|---|
| 5,033,996 A | 7/1991 | Frey | |
| 5,081,885 A | 1/1992 | Shaffer | |
| 5,107,951 A | 4/1992 | Kawamura | |
| 5,265,488 A | 11/1993 | Yang | |
| 5,353,889 A | 10/1994 | Hamada | |
| 5,387,161 A | 2/1995 | Shibahata | |
| 5,647,790 A | 7/1997 | Horiutchi | |
| 5,657,667 A | 8/1997 | Noga et al. | |
| 5,960,670 A | 10/1999 | Iverson et al. | |
| 5,988,006 A | 11/1999 | Fleytman | |
| 5,992,259 A | 11/1999 | Fleytman | |
| 6,074,322 A | 6/2000 | Fleytman | |
| 6,093,126 A | 7/2000 | Fleytman | |
| 6,098,480 A | 8/2000 | Fleytman | |
| 6,148,683 A | 11/2000 | Fleytman | |
| 6,402,652 B1 * | 6/2002 | Fleytman et al. | 475/5 |
| 6,447,418 B1 | 9/2002 | Fleytman | |
| 6,514,167 B1 * | 2/2003 | Fleytman et al. | 475/201 |
| 6,599,213 B2 * | 7/2003 | Fleytman et al. | 475/5 |
| 6,645,112 B1 * | 11/2003 | Fleytman et al. | 475/228 |

* cited by examiner

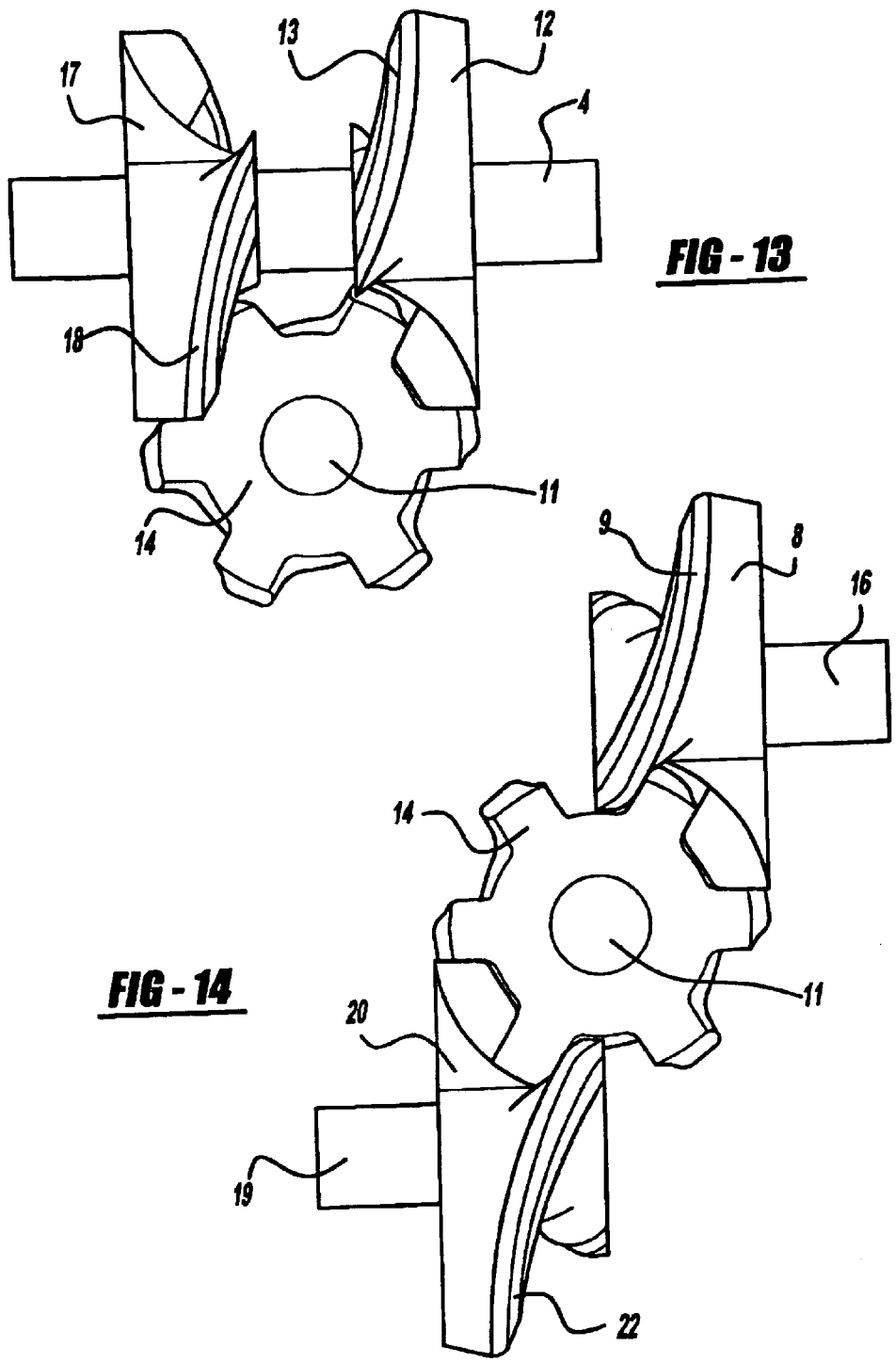

ON-DEMAND TRANSFER CASE

CROSS-REFERENCE TO RELATED APPLICATIONS

This application is a continuation of U.S. patent application Ser. No. 09/689,401 filed on Oct. 12, 2000, now U.S. Pat. No. 6,645,112, which claims the benefit of provisional application Ser. No. 60/159,893 filed Oct. 15, 1999, and Ser. No. 60/159,894 filed Oct. 15, 1999.

FIELD OF THE INVENTION

The present invention relates generally to transfer cases for use in four-wheel drive vehicles and, more particularly, to a variable ratio torque transfer coupling for transfer cases.

BACKGROUND OF THE INVENTION

In general, power transfer mechanisms, such as transfer cases, are operatively associated with both manual and automatic transmissions for directing power to the non-driven wheels of a motor vehicle for establishing a four-wheel drive mode. Many automotive transfer cases are now equipped with a torque transfer assembly that is capable of automatically shifting ("on-demand") between the two-wheel drive mode and the four-wheel drive mode. Examples of on-demand transfer cases incorporating torque transfer coupling are shown in U.S. Pat. Nos. 5,215,160; 5,443,426; 5,400,866; 5,597,369; 6,041,903; and 6,112,874. While such on-demand transfer cases have proven to provide enhanced traction control compared to traditional part-time transfer cases, the need exists for continued development of improved torque transfer systems.

SUMMARY OF THE INVENTION

In view of the foregoing, it is an object of the present invention to provide a unique torque transfer system for use in vehicular power transfer assemblies which can continuously vary the torque transferred from an input member to an output member;

It is another object of the present invention to incorporate the variable torque transfer system into on-demand transfer cases for use in four-wheel drive vehicles.

As a related object, the variable torque transfer system can be arranged to permit the vehicle operator to select between distinct two-wheel and four-wheel drive modes or operate in an adaptive mode where the torque transfer is automatically varied in response to vehicular operating and/or road conditions to improve the vehicle's tractive performance.

Accordingly, the torque transfer system of the present invention includes a variable drive mechanism for selectively rotating a component of a geared differential unit to vary the torque transferred from the input member to the output member. More particularly, drive mechanism includes a unique worm/worm gear transmission which is operatively coupled to a carrier member of the differential unit. When the drive mechanism is held fixed, the carrier does not rotate and there is no reduction between the input and output members. However, rotation of the drive mechanism causes the carrier to rotate relative to the input member which functions to change the percentage of the total torque transferred to the output member. By varying the relative rotational velocity of the carrier member it is possible to vary the torque transfer ratio of the transfer case and provide a variable on-demand system. Preferably, the drive mechanism includes a variable speed motor having an output arranged to drive the worm/worm gear transmission so as to control rotation of the carrier associated with the differential unit. An electronic control system is provided to control actuation of the motor in response to certain operating characteristics of the vehicle.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 13 shows a worm/worm gear transmission with two modified worms aligned on the same axis of rotation and connected to a common shaft;

FIG. 14 shows a worm/worm gear transmission with two modified worms located on different axes of rotation;

DETAILED DESCRIPTION OF THE PREFERRED EMBODIMENTS

Figure 1:
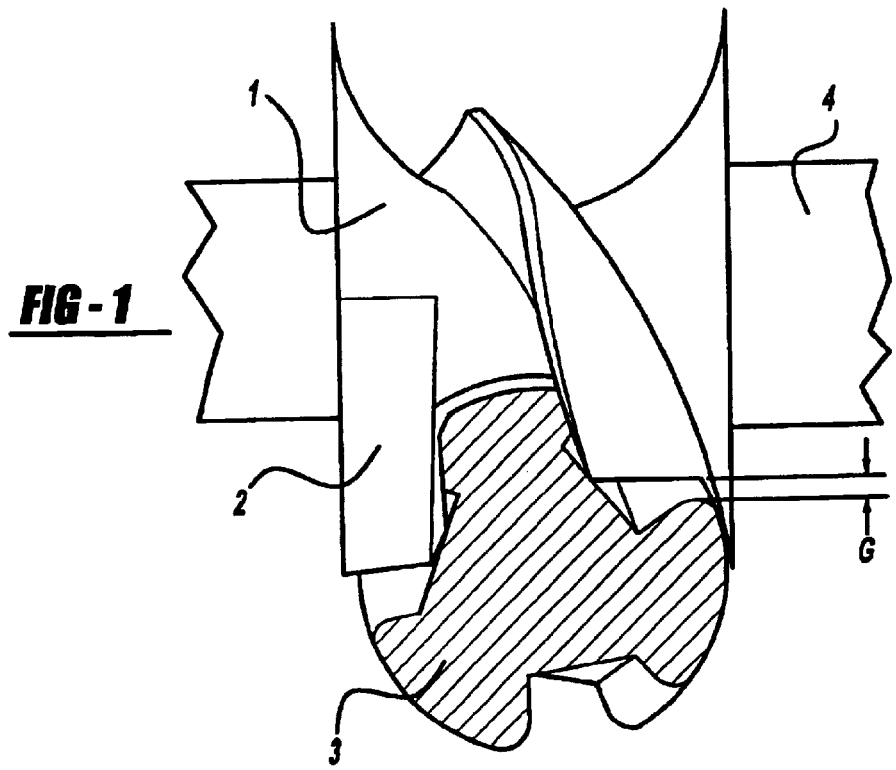
FIG. 1 is a sectional view of a worm/worm gear transmission with the worm gear having three teeth according to the principles of the present invention.
Figure 2:
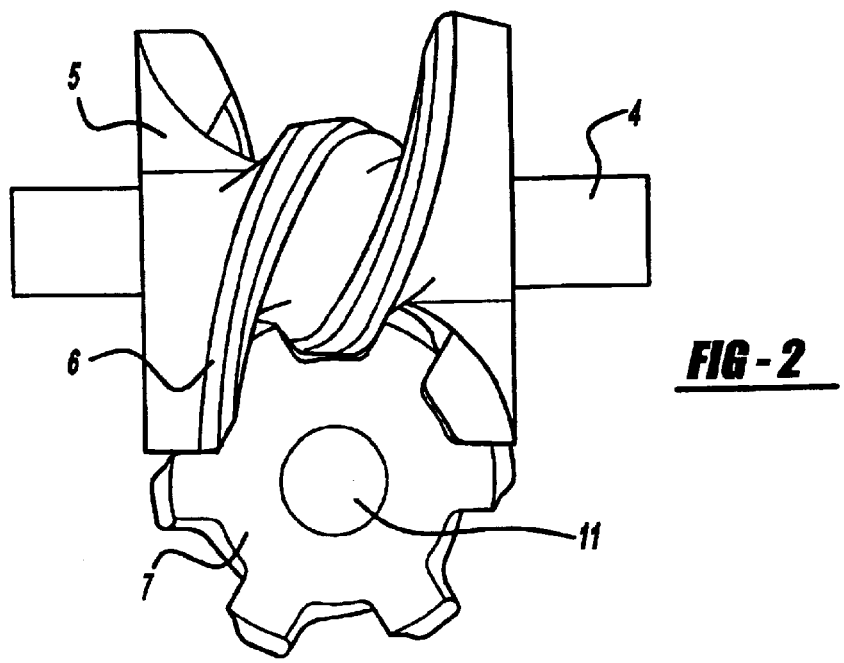
FIGS. 2 and 3 are views of a worm/worm gear transmission with the worm gear having six teeth according to the principles of the present invention.

In general, the present invention relates to a variable torque transfer system which is capable of functioning at any point in the continuum of torque levels between a no-torque operating state and a high-torque operating state. Thus, the present invention is adapted for use in virtually any transfer case of a four-wheel drive vehicle for permitting selective shifting or automatic variable control between a two-wheel drive mode (2WD) and a locked four-wheel drive mode (4WD-LOCK) and at any point in the torque range therebetween. The variable torque transfer system for use in transfer cases according to the principles of the present invention will be described below with reference to FIGS. 24 through 27. However, the following discussion relating to FIGS. 1–23 provides a detailed description and several examples of the unique enveloping-type worm/worm gear transmissions which can be utilized with the variable range system of the present invention.

The reason for using an enveloping-type worm gear is that this type of worm gear has a natural profile of tooth surface which is distinct from other types of thread followers. The configuration of the worm gear teeth is generated by the profile of the thread or threads of the worm. A computer model simulation is utilized to generated the configuration of the worm gear teeth of the worm gear. The worm gear is then formed using known techniques such as hobbing or casting. When the worm gear teeth are generated by the profile of the threads of the worm having different lengths for the same enveloping angle (shortened), the profiles of the worm teeth is different. The main advantage for using the enveloping-type worm gears is more torque capacity.

The worm thread has a rolling action contract relationship with the teeth of the worm gear which provides an increased efficiency. Furthermore, it is beneficial to have the pitch diameter in the center of the worm gear. With standard worm designs, with more than one thread and a large enveloping angle, the inability to assemble the worm and worm gear was considered a major obstacle. With the worm and worm gear of the present invention, the worm and worm gear are easily assembled by properly orienting the worm thread and worm teeth.

According to the present invention, the greater enveloping angle for one revolution of the worm thread permits the use of worm gear teeth without undercut portions. Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmission of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two, with an increase in achieved efficiency, in contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets which are used in low ratio right-angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

In this application, it is possible to have "surface to surface" contact between the worm gear teeth and the worm thread, thereby increasing the torque capacity of the enveloping worm/worm gear transmission. This became feasible when the enveloping angle for one revolution of worm thread is equal or greater than 15 degrees. In all standard enveloping worm/worm gear transmissions, only "line" contact is obtained between the thread and worm gear teeth or thread followers. This physical distinction has realized new and unexpected results with regard to the torque capacity of the worm/worm gear transmission of the present invention. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

In accordance with one feature of the present invention, a worm/worm gear transmission is utilized to transmit rotation with the smallest ratio between the worm gear teeth and one worm thread. In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only two but is preferably larger than 15 degrees. Further detail of the use of the unique worm/worm gear transmission discussed herein can be found in U.S. Pat. No. 5,992,259 entitled "Worm/Worm Gear Transmission and Apparatus for Transmitting Rotation Utilizing An Oscillating Input" and U.S. application Ser. No. 09/290,911 filed Apr. 12, 1999 titled "Worm/Worm Gear Transmission," both of which are owned by the inventor hereof and which are also expressly incorporated by reference hereto.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

Referring now to the drawings, one embodiment of a worm/worm gear transmission 8 of the present invention is illustrated in FIG. 1. Transmission 8 has an enveloping type worm 10 with at lease one screw thread 12. Enveloping type worm 10 is supported on a shaft 13. Thread 12 is engaged by at least one tooth 14 of an enveloping type worm gear 16, which is shown to have three teeth 14. As shown in FIG. 1, enveloping worm 10 has single thread 12 and worm gear 16 has three teeth 14 spaced about its circumference. As is also show, a gap "G" exists between any tooth on worm gear 16 and thread 12 on enveloping worm 10. Enveloping worm 10 wraps around enveloping worm gear 16, and enveloping worm gear 16 also wraps around enveloping worm 10. Worm gear 16 and worm 10 are preferably enclosed in a housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown).

Figure 17:
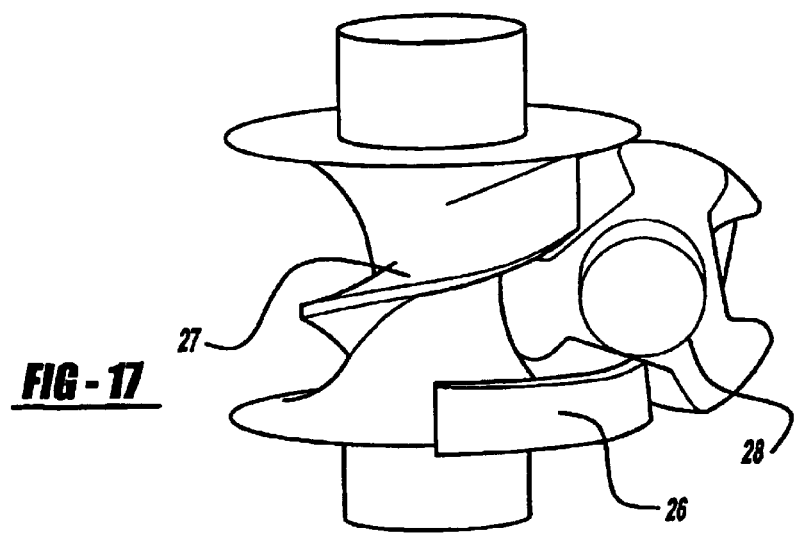
FIG. 17 is a perspective view of the worm/worm gear transmission shown in FIG. 1 with three worm gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 14a presses downward on tooth 14a to cause rotation of worm gear 16 in the direction of Arrow "B." As worm gear 16 rotates, gear tooth 14b then comes into engagement with thread 12 and is acted on to cause further rotation of worm gear 16 as gear tooth 14a disengages from thread 12.

Figure 3:
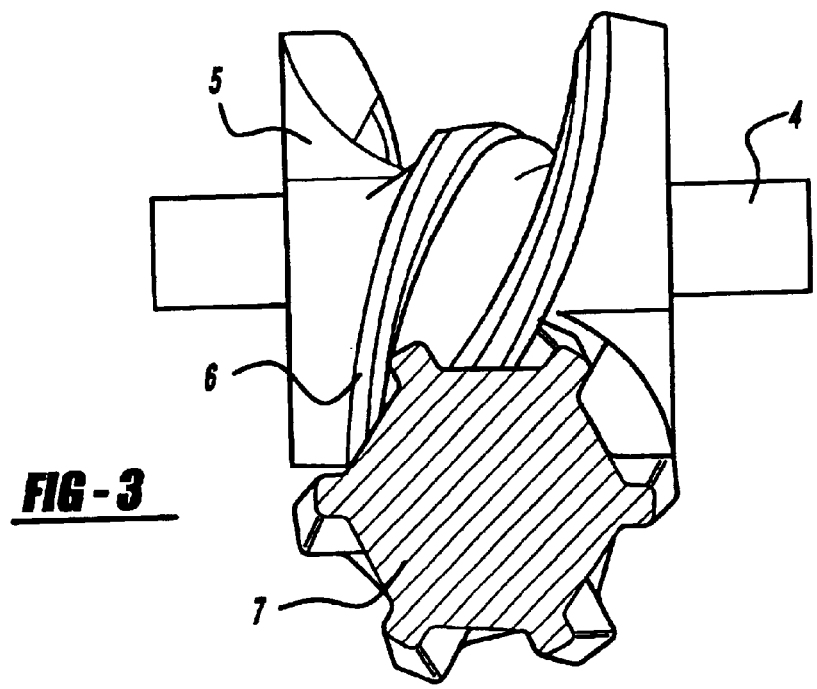
Figure 4:
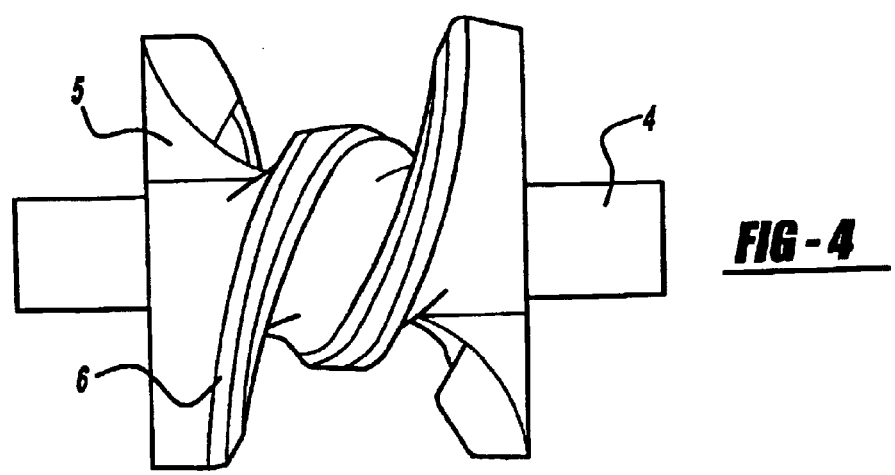
FIG. 4 is a side view of an enveloping worm having two threads.
Figure 18:
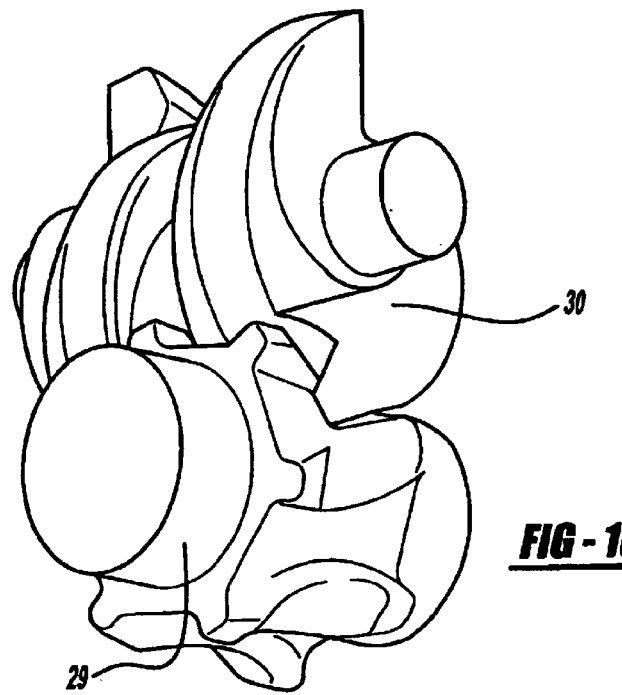
FIG. 18 is a perspective view of the worm/worm gear transmission shown in FIG. 2 with six worm gear teeth and two threads on the worm.

Another embodiment of a worm/worm gear transmission 20 of the present invention is illustrated in FIG. 1. This transmission has an enveloping-type worm 22 with two identical screw threads 24. Threads 24 are each engaged by at lease one tooth of an enveloping-type worm gear 26 shown to have six teeth 28. Worm gear 26 is connected to a shaft 30 while worm 22 is connected to a shaft 32. In FIG. 3, worm gear 26 is shown in cross-section. FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
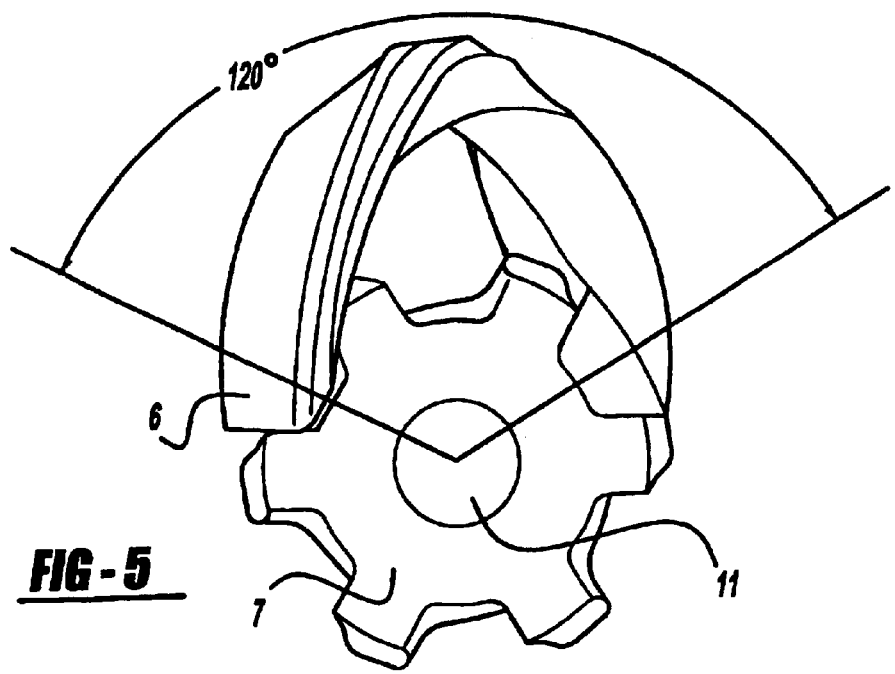
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360° around the axis of rotation for shaft 32.

Figure 21:
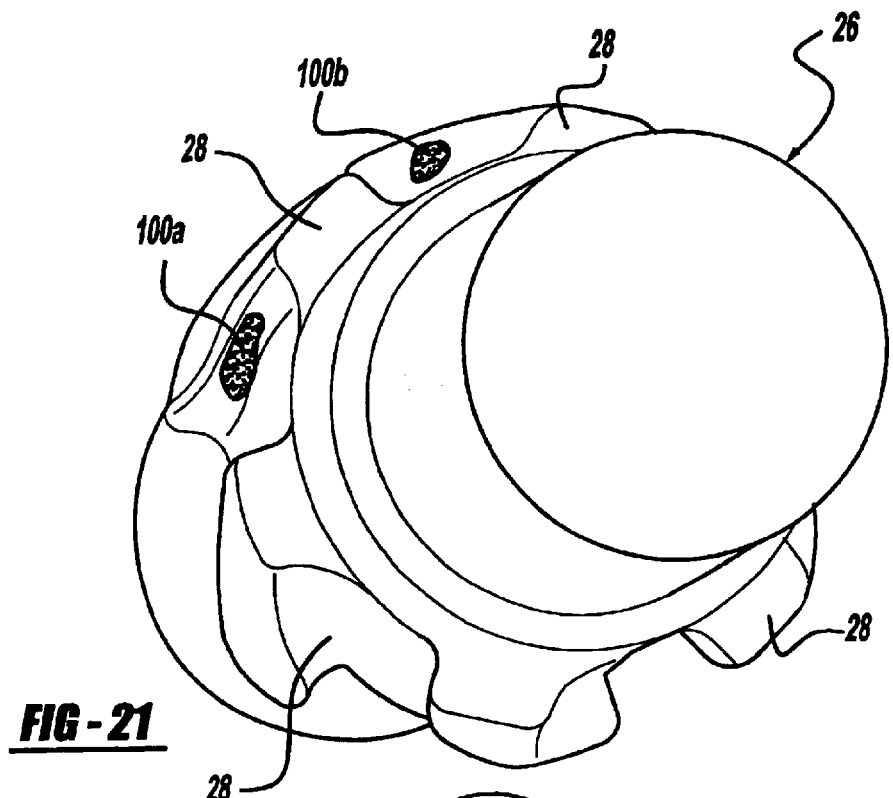
FIG. 21 is a perspective view of a worm gear with six teeth with darkened spots illustrated on the surface of the teeth to indicate the contact surface with the worm in mesh.
Figure 22:
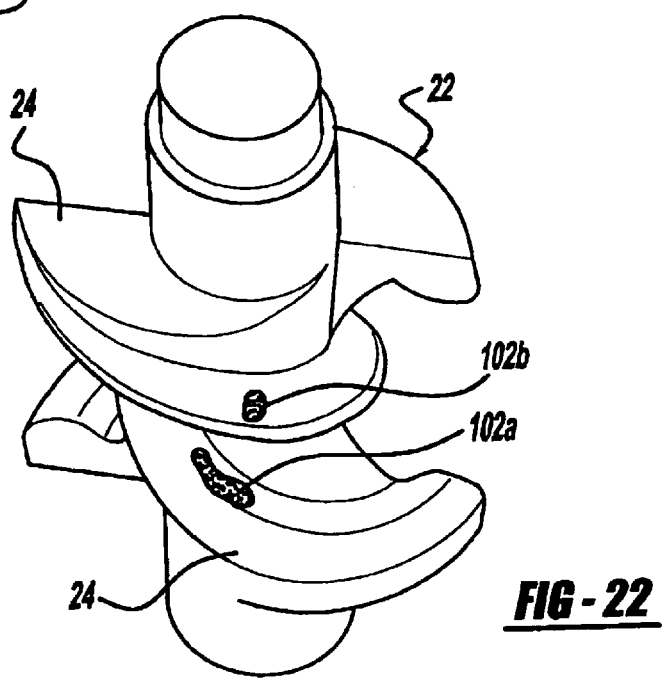
FIG. 22 is a perspective view of a worm with two threads with darkened spots illustrated on the surface of the thread to indicate the contact surface with the worm gear in mesh.

The enveloping worm/worm gear transmissions of the present invention provide for a worm gear having fewer than twenty-four teeth and also provides surface contact between the thread of the worm and the teeth of the worm gear as illustrated in FIGS. 21 and 22. FIG. 21 illustrates two surface contact spots 100a, 100b for a worm gear 26 having six teeth 28. FIG. 22 illustrates two corresponding surface contact spots 102a, 102b for a worm 22 with two threads 24.

Figure 6:
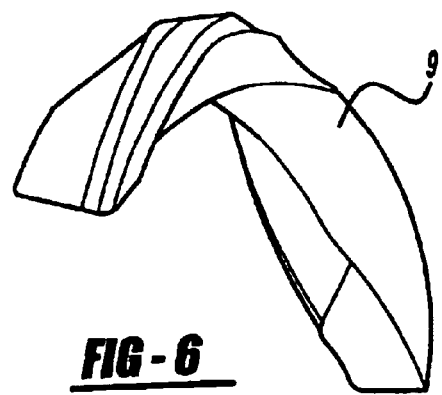
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
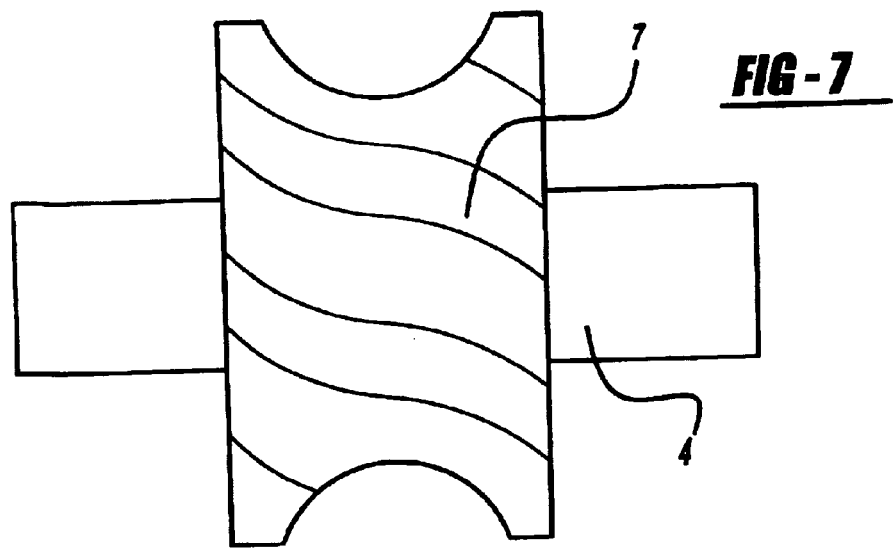
FIG. 7 shows an enveloping worm gear according to the principles of the present invention.
Figure 8:
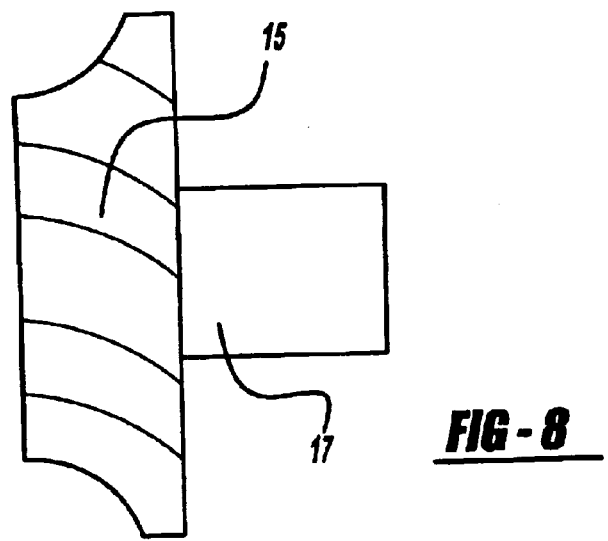
FIG. 8 shows a modified enveloping worm gear.

FIG. 7 shows a side view of enveloping worm gear 26 with six teeth 28. FIG. 8 shows an enveloping worm gear 44 having six teeth 34 which is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm or worm gear allows for disassembling the entire worm gear-collars-shaft assembly.

In the present invention, it is preferred that the ratio of the number of teeth 14 on worm gear 16 relative to the number of threads 12 on worm 10 is 11 to 1 and less. Most preferably, the ratio is three or even less, as shown. It is possible that only two teeth 14 need to be utilized on worm gear 16. The worm/worm gear transmission used in the present application could also include a self-lock feature. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
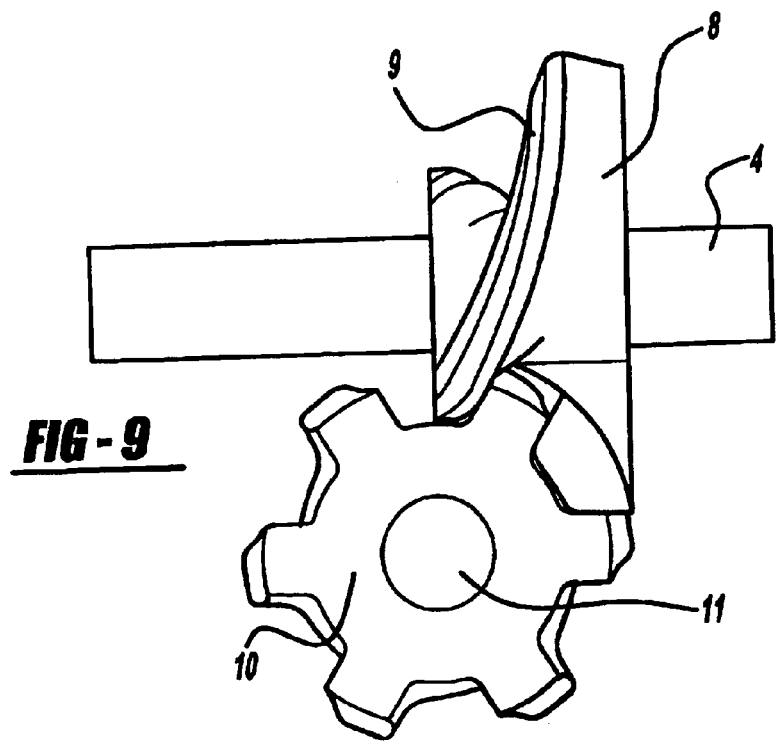
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
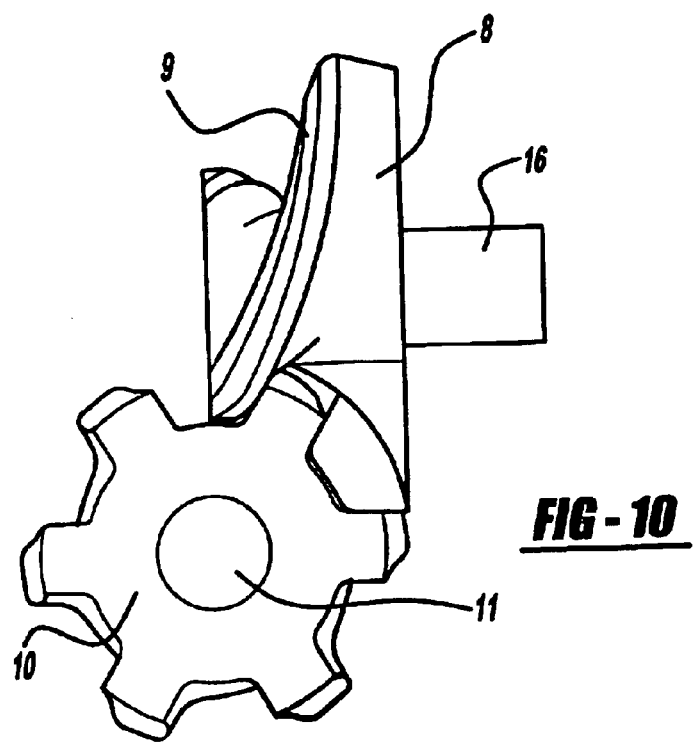
Figure 11:
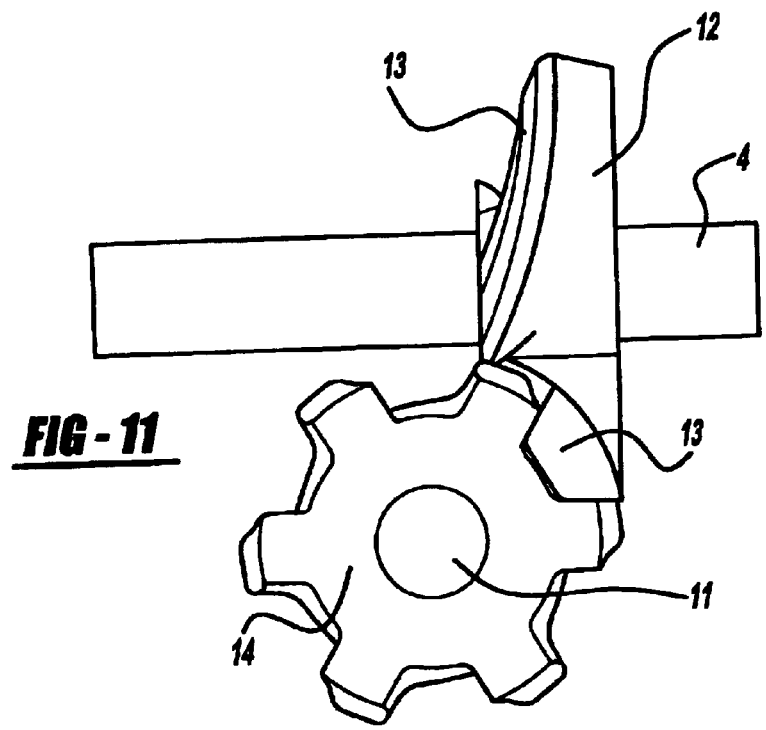
FIG. 11 shows a worm/worm gear transmission with a modified worm in an off-center position.
Figure 12:
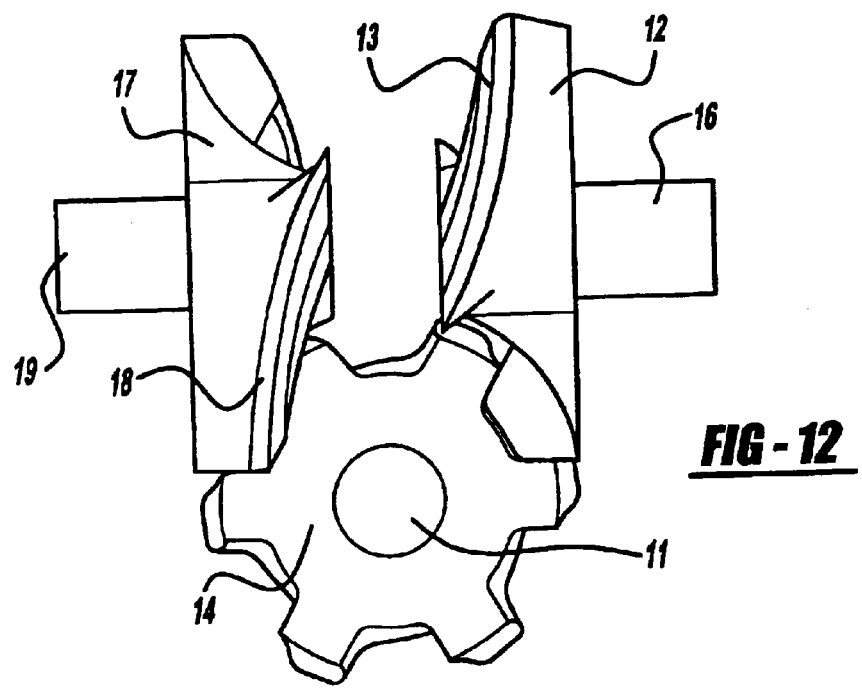
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

FIG. 14 shows a view of a worm/worm gear transmission with two modified worms 60 having worm threads 68 each placed on different axes of rotation and connected to different drive shafts 70 and 72. Each of worms 60 meshingly engages the worm gear 62 having teeth 64.

Figure 15:
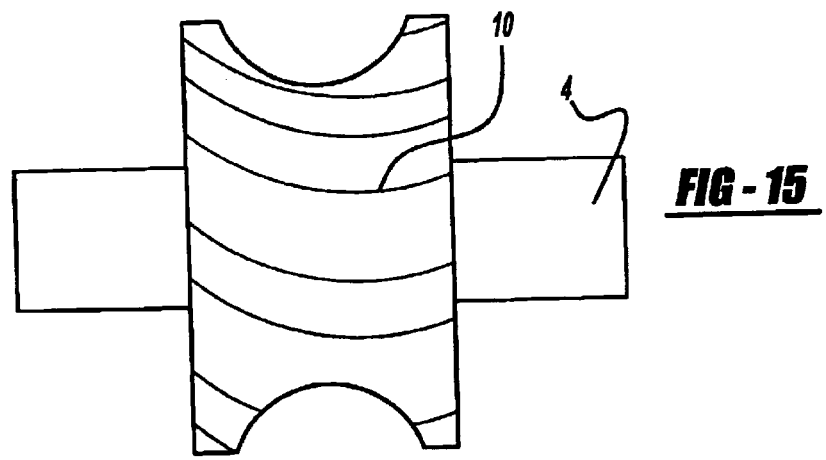
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
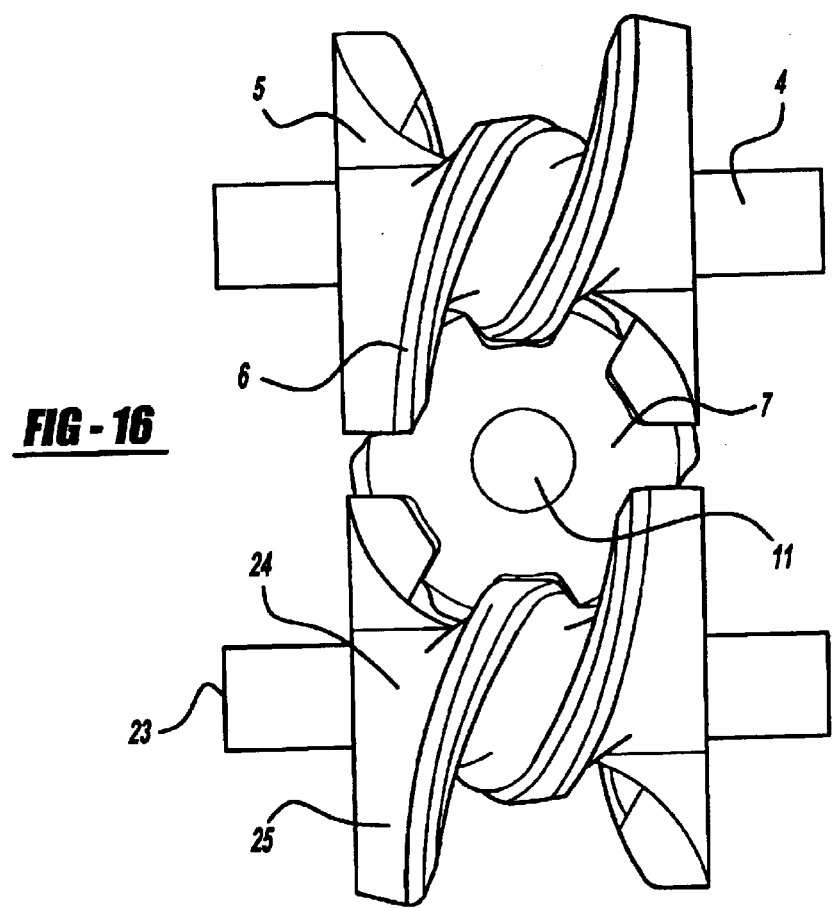
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26.

Figure 19:
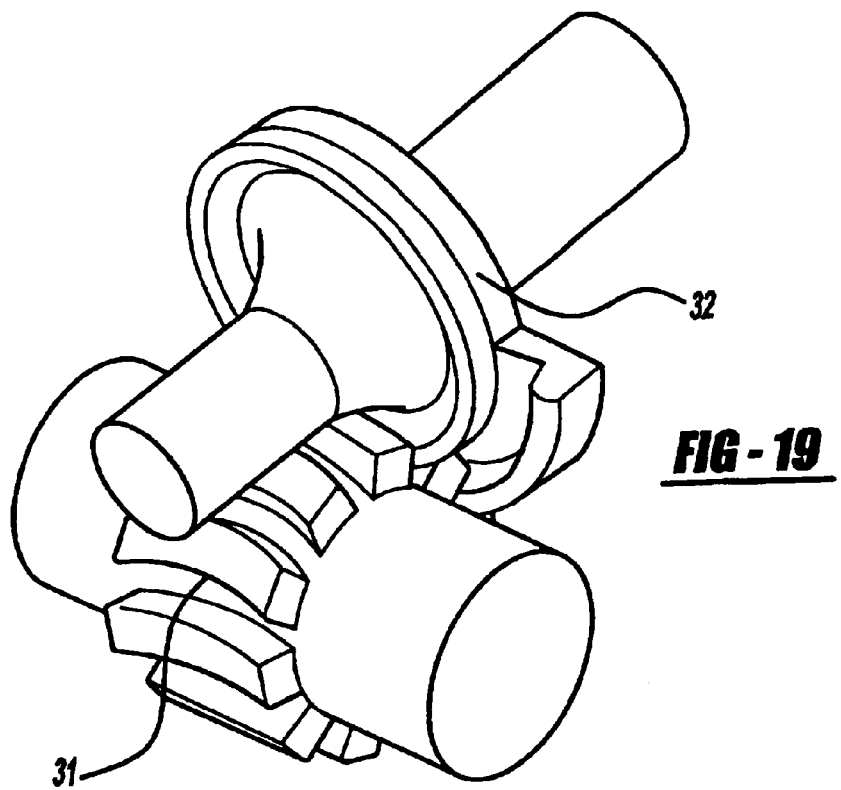
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
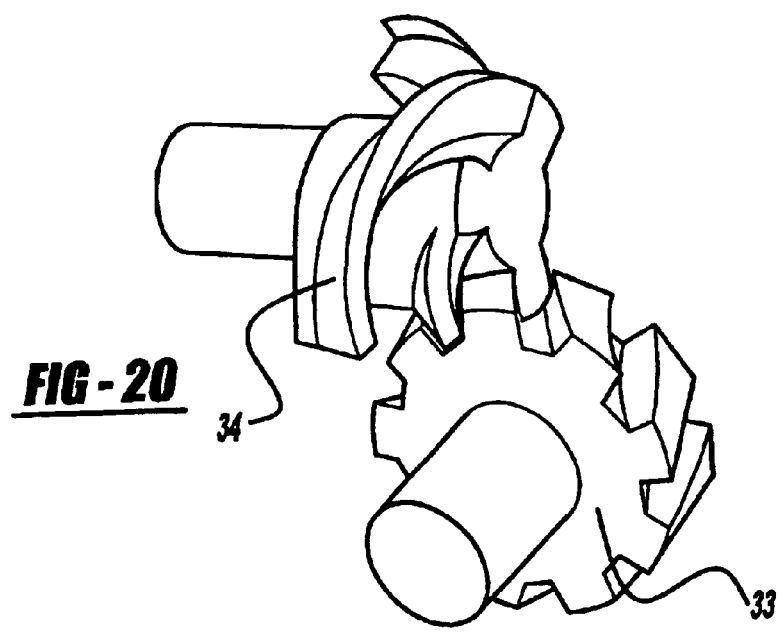
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
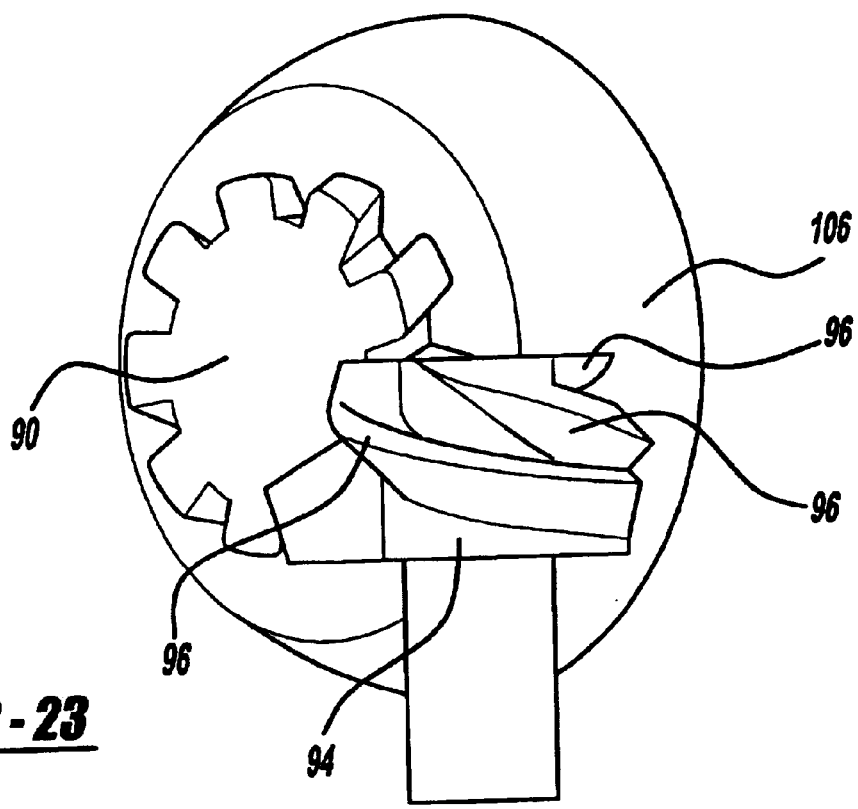
FIG. 23 illustrates the size difference of the worm/worm gear transmission of FIG. 20 in comparison to the size of a typical hypoid gear.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown.

Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms, could be used in a split-power transmission, to transmit energy from a high-speed engine to a rotary drive shaft. In the present invention, a self-locking worm/worm gear combination can have a worm gear to worm thread ratio that is preferably ten and less. Such a system is desirable so that each one of the worm and worm gear combinations described above can transmit very high torque loads when compared to prior systems. The lower noise of the worm/worm gear transmission, compared with hypoid and bevel gear transmission, make using the worm/worm gear transmission of the present invention more beneficial, particularly in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission. Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications.

Figure 24:
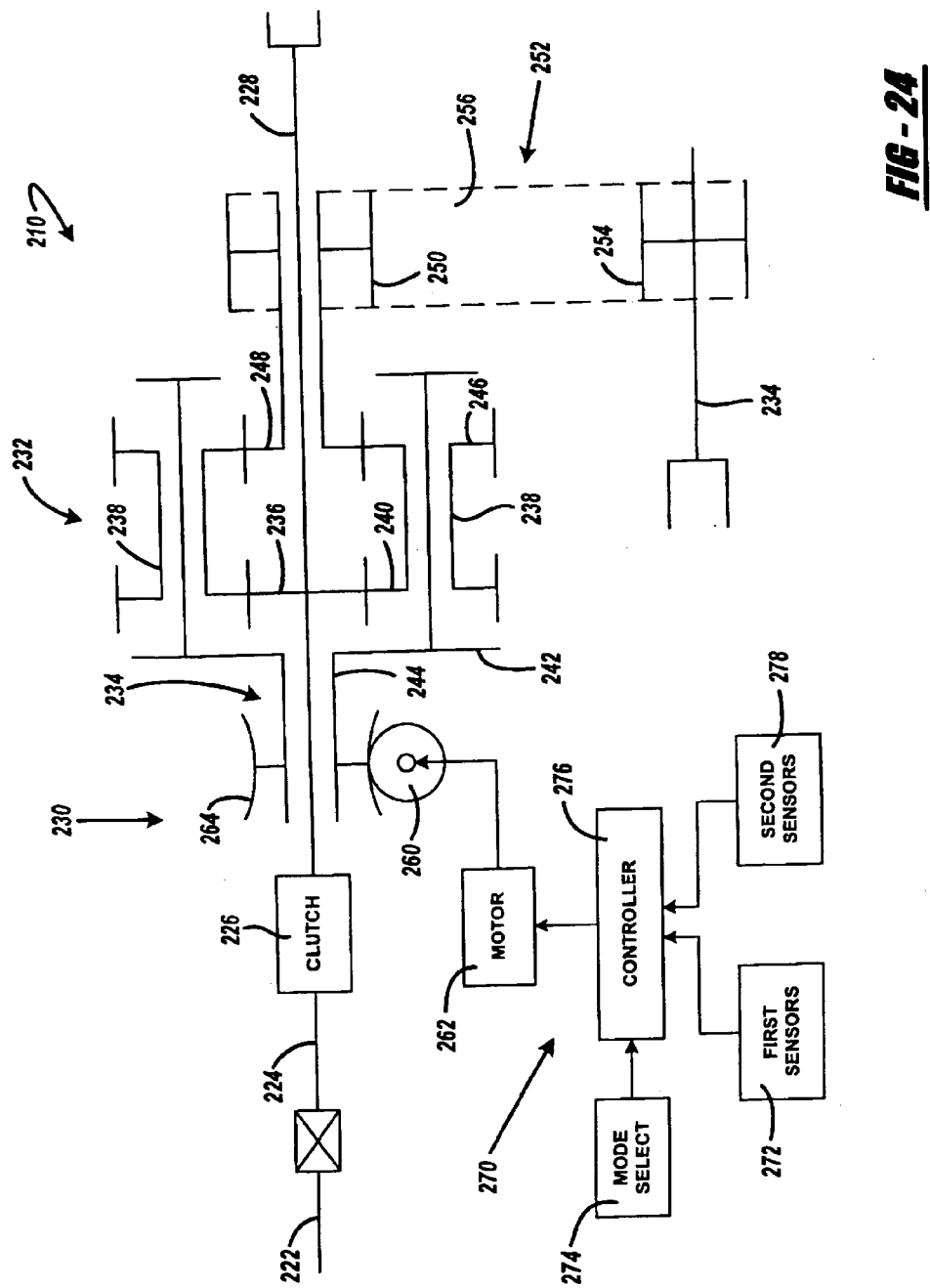
FIG. 24 is a schematic view of the continuously variable four-wheel drive transfer case according to the principles of the present invention.

With reference now to FIG. 24, there is shown an exemplary transfer case 210 of the type well-suited for use in four-wheel drive motor vehicles. A transmission output shaft 222 is connected with a transfer case input shaft 224 such that both are rotatably driven by an engine of the motor vehicle. A clutch 226 is provided for releasably coupling input shaft 224 to a first or rear output shaft 228 of transfer case 210. Clutch 226 is shown in a block format to illustrate the applicability of any type of clutching device capable of causing torque to be transferred from input shaft 224 to rear output shaft 228. For example, clutch 226 may include a synchronized dog clutch for permitting the vehicle operator to activate a two-speed reduction gearset for shifting two-speed transfer case 210 between its high-range and low-range operating modes.

Transfer case 210 is operable for transferring rotary power (i.e., drive torque) from the engine to the vehicle's front wheels and rear wheels. Accordingly, transfer case 210 is shown to include a torque transfer assembly 230 that is operable for transferring drive torque from rear output shaft 228 to a second or front output shaft 234. As is conventional, rear output shaft 228 is connected to the vehicle's rear driveline while front output shaft 234 is connected to the vehicle's front driveline. Transfer case 210 functions to permit selective or automatic transfer of drive torque to front output shaft 234. In particular, torque transfer assembly 230 can be operated in a "manual" mode for permitting the vehicle operator to intentionally shift transfer case 210 between a two-wheel drive (2WD) mode and a locked or "part-time" four-wheel drive (4WD-LOCK) mode. Additionally, torque transfer assembly 230 can be operated in an "adaptive" mode for automatically modulating the amount of drive torque transferred between minimum and maximum levels (i.e. between the 2WD and 4WD-Lock modes) without any input from the vehicle operator.

Torque transfer assembly 230 includes a differential unit 232 and a variable drive mechanism 234. Differential unit 232 is shown to be a planetary gear assembly which includes a first sun gear 236 fixed for rotation with rear output shaft 228 and which is surrounded by a plurality of compound planet gears 238 each having a first gear portion 240 meshingly engaged with first sun gear 236. Compound planet gears 238 are rotatably supported by a carrier 242 having a longitudinally-extending sleeve segment 244 journally supported on rear output shaft 228. Each compound planet gears 238 also has a second gear portion 246 which is meshingly engaged with a second sun gear 248. Second sun gear 248 is fixed for rotation with a drive sprocket 250. A power transfer unit 252 is shown to include drive sprocket 250 which is rotatably journalled on rear output shaft 228, a driven sprocket 254 fixed to front output shaft 234, and a chain 256 coupling sprockets 250 and 254.

Drive mechanism 234 includes a worm 260 which is rotatably driven by an electric motor 262. Worm 260 is meshingly engaged with a worm gear 264 which, in turn, is fixed for rotation with sleeve segment 244 of carrier 242. According to a most preferred embodiment, worm 260 and worm gear 264 are of the double enveloping-type described above and the ratio of the number of teeth on the worm gear to the number of threads on the worm is low. Preferably, enveloping worm gear 264 has fewer than twenty-four teeth.

When it is desired to change the torque transfer ratio between rear output shaft 228 and front output shaft 234, drive mechanism 234 is actuated. Specifically, actuation of motor 262 causes enveloping worm 260 to be rotated for driving enveloping worm gear 264 which, in turn, rotates carrier member 242 of planetary gear assembly 232. By varying the relative rotational velocity of carrier member 242 with respect to rear output shaft 228, the resulting rotational velocity of front output shaft 234, and the torque delivered thereto, can be controlled. This variable control is provided by motor 262 being of the variable speed type.

As noted, the torque transfer arrangement is operable in a Manual select mode to permit the vehicle operator to select between the two-wheel drive mode and the locked four-wheel drive mode. Additionally, the torque transfer arrangement is operable in the Adaptive mode for transferring drive torque "on-demand" from rear output shaft 228 to front output shaft 234. To permit such operation, a power transfer control system 270 is provided in conjunction with transfer case 210. Control system 270 includes a first group of sensors 272 for sensing specific dynamic and operational characteristics of the motor vehicle and generating sensor input signals indicative thereof, a mode selector 274 for permitting the vehicle operator to select one of the available drive modes and generate a mode signal indicative thereof, and a controller 276 for generating control signals in response to the sensor input signals and the mode signal. Preferably, first sensor group 272 includes, among others, sensors for detecting the rotary speed of input shaft 224 and output shafts 228 and 234. Controller 276 is an electronic control unit capable of controlling actuation of motor 262 of drive mechanism 234 for controlling the torque transferred to front output shaft 234 through planetary gearset 232. In a preferred embodiment, the worm/worm gear transmission associated with drive mechanism 234 is self-locking so that no additional lockout mechanism is required. However, if a non-self-locking worm/worm gear transmission is utilized, a separate lockout mechanism can be utilized and controlled by controller 276 to prevent rotation of carrier 242 when desired.

In the system disclosed, controller 276 is operable for controlling the amount of drive torque transfer through torque transfer assembly 230 to front output shaft 234 by controlling the control signal sent to motor 262. When the two-wheel drive mode is selected via actuation of mode selector 274, all drive torque is delivered to rear output shaft 228. Specifically, worm 260 is rotated by motor 262 at a matched speed to that of worm gear 264 which is driven by carrier 242 such that second sun gear 248 is not driven in response to rotation of rear output shaft 228. When the part-time four-wheel drive mode is selected, torque transfer assembly 230 locked-up such front output shaft 234 is, in effect, rigidly coupled for driven rotation with rear output shaft 234. In particular, the locked four-wheel drive mode is established when carrier 242 is held against rotation by the self-locking worm/worm gear transmission with motor 262 turned off. As a result of carrier 242 being held stationary, first sun gear 236 and second sun gear 248 are driven at a common speed. When the "on-demand" four-wheel drive mode is selected, controller 276 controls variable actuation of motor 262 in response to current vehicle operating conditions. As such, controller 276 instantaneously varies the amount of drive torque directed through planetary gear reduction unit 232 as a function of the sensor input signals for providing enhanced tractive performance. It is contemplated that torque control can be based on the speed difference (ΔRPM) between the output shafts of transfer case 210, with only the required torque bias being directed to front output shaft 234.

Power transfer control system 270 can additionally include a second group of sensors 278 for generating "operated-initiated" input signals that are indicative of the position of one or more movable control elements (i.e., brake pedal, throttle, position, steering angle, etc.) under the control of the vehicle operator. The operator-initiated input signals are used for establishing control characteristics which, in conjunction with the sensor input signals, further regulate the torque distribution during "on-demand" operation. In the adaptive mode, control of drive mechanism 234 is transparent to the vehicle operator with no manual shifting between distinct modes required. The additional benefit of continuously variable adjustment of the ratio established across drive mechanism 234 is that there is improved traction control, since control is automatic and smooth based on the particular vehicle operating conditions detected by the sensors.

Figure 25:
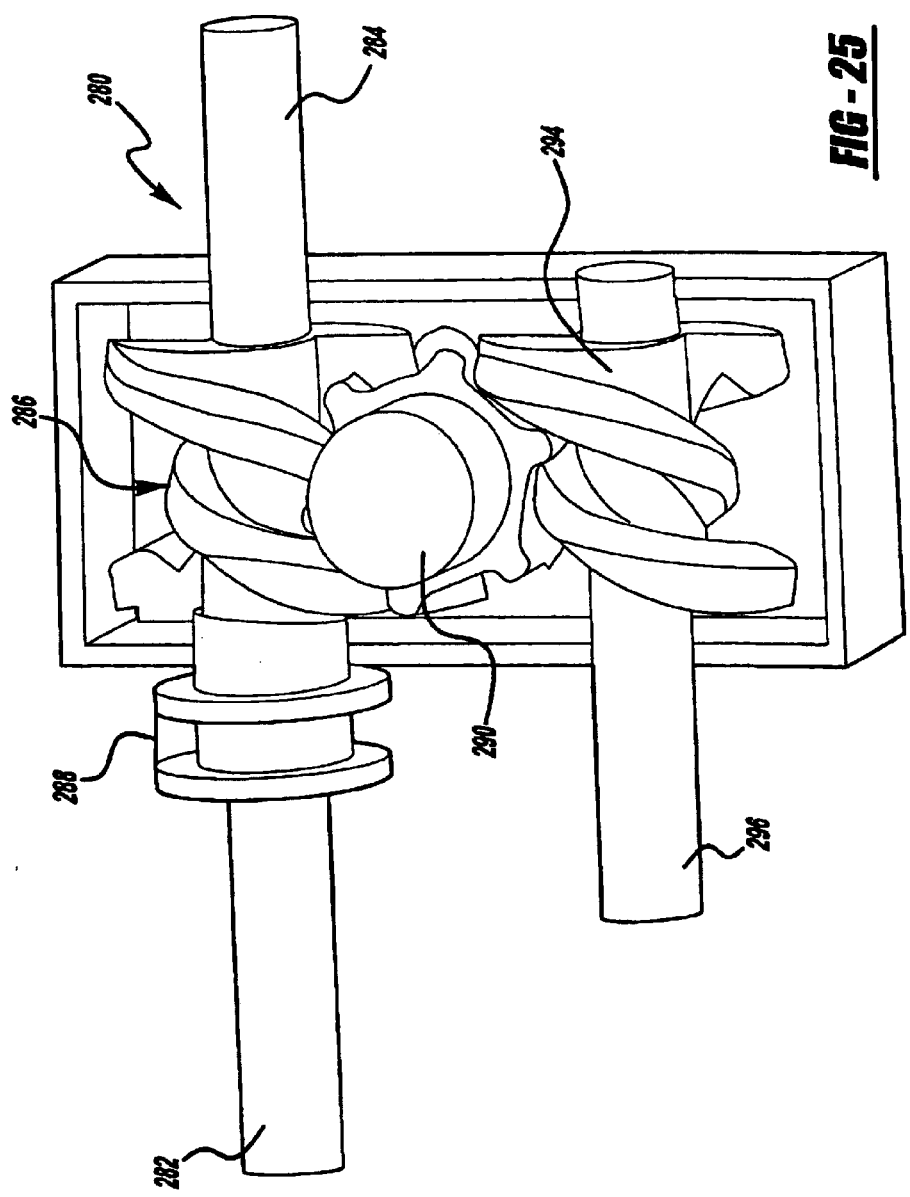
FIGS. 25 and 26 are views showing alternative uses for the worm/worm gear transmissions in four-wheel drive transfer cases.

The double enveloping worm/worm gear transmissions described above can further be utilized with a four-wheel drive transfer case 280 as shown and described with reference to FIG. 25. Transfer case 280 includes an input shaft 282 which is drivingly connected to the output of a vehicular powertrain. Input shaft 282 transfer torque to rear output shaft 284 of transfer case 280 either directly or through various types of well-known planetary systems used as a speed reduction unit for providing high and low speed ranges. A first enveloping worm 286 is rotatably mounted on rear output shaft 284 and is selectively engagable for rotation therewith via actuation of a torque transfer coupling or clutch 288. Alternatively, first worm 286 may also be selectively engagable with input shaft 282 for rotation therewith. The gear teeth of an enveloping worm gear 290 are in meshing engagement with the thread(s) of first enveloping worm 286. In addition, worm gear 290 acts as an idler gear for transmitting torque to a second enveloping worm 294 which is fixedly mounted on front output shaft 296. First enveloping worm 286, enveloping worm gear 290, and second enveloping worm 294 define a transfer mechanism which is applicable to replace standard sprocket and chain drive systems like that disclosed previously. Transfer case 280 is operable in a two-wheel drive mode when torque transfer coupling 288 is disengaged so that first enveloping worm 286 is not driven by input shaft 282 or rear output shaft 284. Thus, no torque is transmitted to the front output shaft 296.

Upon engagement of torque transfer coupling 288, torque is transmitted from rear output shaft 284 to first worm 286 which then transfers rotary power to worm gear 290 which, in turn, transfers torque to second worm 294 for driving front output shaft 296, thereby providing a four-wheel drive operating mode. With the highly efficient double enveloping worm/worm gear transmission of the present invention, the use of the worm/idler gear in place of standard chain drive transfer mechanisms is quieter, more compact and potentially less expensive to manufacture.

Figure 26:
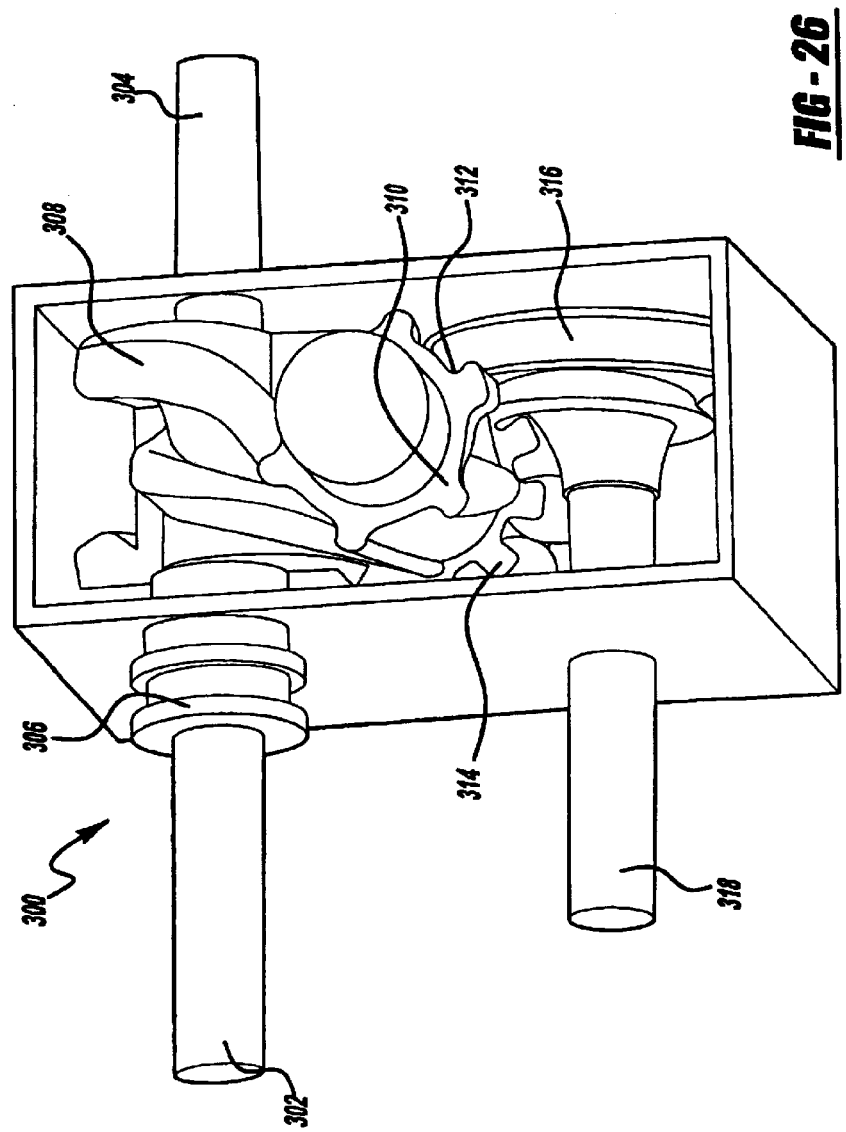

With reference to FIG. 26, the double enveloping worm/worm gear transmission as described above can further be utilized with a traction control unit 300. Traction control unit 300 includes an input shaft 302 which is drivingly connected to the vehicle's powertrain. Input shaft 302 transmits torque to a first output shaft 304 either directly or through a known coupling device 306. A first enveloping worm 308 is rotatably mounted on first output shaft 304. Enveloping worm 308 is in meshing engagement with a first enveloping worm gear portion 310 of a compound worm/idler gear 312. Compound worm/idler gear 312 further includes a second enveloping worm gear portion 314 which is fixedly mounted for rotation with first enveloping worm gear portion 310. A second enveloping worm 316 is in meshing engagement with second enveloping worm gear portion 314 of compound worm/idler gear 312 and is rigidly mounted to a second output shaft 318.

When engaged, torque is transmitted from first output shaft 304 to worm 308 which drives first worm gear portion 310 of compound worm gear 312 which, in turn, drives second worm gear portion 314. Second worm 316 and second worm gear portion 314 of compound worm/idler gear 312 have self lock so that drive rotation cannot be transmitted from second worm gear portion 314 of compound worm/idler gear 312 to second worm 316. Since second worm 316 and second worm gear portion 310 have self-lock, first output shaft 304 is prevented from rotating faster than second output shaft 318 since the mating combination between second worm gear portion 314 and second worm 316 locks to prevent such speed differentiation. Thus, traction control unit 300 of the present invention provides locking traction control.

Figure 27:
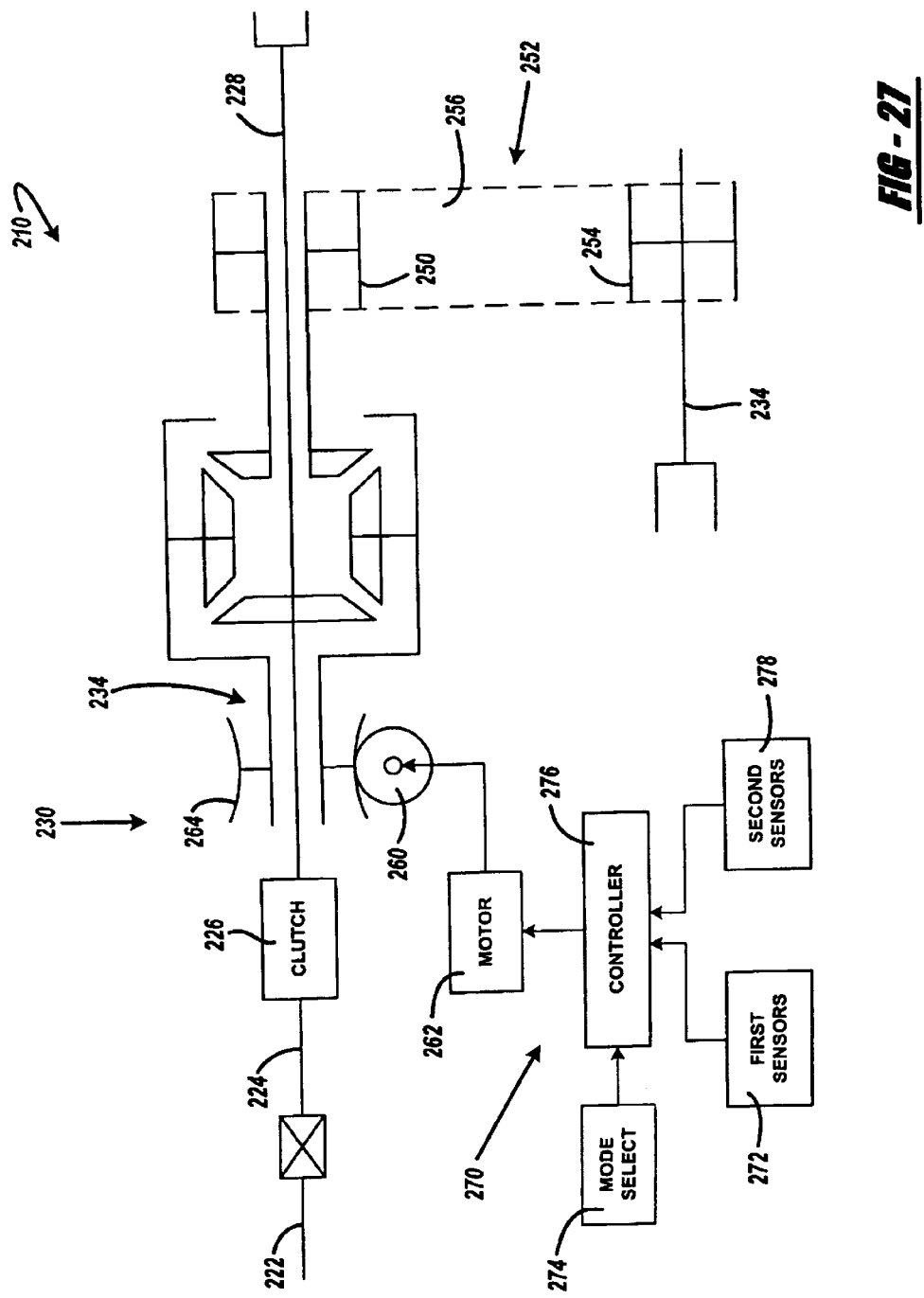
FIG. 27 is a schematic view of a continuously variable four-wheel drive transfer case according to an alternative embodiment of the invention.

Referring now to FIG. 27, a transfer case 210' is shown which is generally similar to transfer case 210 of FIG. 24, with the exception that torque transfer assembly 230 includes a bevel-type differential unit 232' instead of planetary-type differential unit 232. Specifically, bevel gear assembly 232' includes a first side gear 336 fixed for rotation with rear output shaft 228, a second side gear 338 fixed for rotation with drive sprocket 250, and pinion gears 340 meshed with side gears 336 and 338. Pinion gears 340 are rotatably supported for rotation with a carrier 342 having a longitudinally-extending sleeve segment 344 journally supported on rear output shaft 228. As before, variable drive mechanism 234 includes a worm gear 264 fixed to sleeve segment 344 of carrier 342, a worm 260, and an electric motor 262. In operation, actuation of motor 262 causes worm 260 to be rotated for driving worm gear 264 which, in turn, rotates carrier 342 to vary its rotational speed relative to rear output shaft 228. Control system 270 is again applicable to control establishment of distinct two-wheel and four-wheel drive modes and the automatic "on-demand" four-wheel drive mode.

Several embodiments of the present invention have been disclosed. A worker of ordinary skill in the art would recognize that certain modifications would come within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transfer assembly for use in a motor vehicle having a powertrain and first and second drivelines comprising:
   a first output shaft adapted to transmit drive torque from the powertrain to the first driveline;
   a second output shaft adapted to transmit drive torque to the second driveline; and
   a torque transfer mechanism for transferring drive torque from said first output shaft to said second output shaft, said torque transfer mechanism including a first gearset operably interconnecting said first output shaft to said second output shaft, a second gearset having a worm meshed with a worm gear fixed for rotation with a component of said first gearset, and an electric motor driving said worm, wherein said worm gear has less than twenty-four teeth.

2. A transfer case for use in a four-wheel drive vehicle having a powertrain and first and second drivelines, comprising:
   a first output shaft adapted to transmit drive torque from the powertrain to the first driveline;
   a second output shaft adapted to transmit drive torque to the second driveline;
   a differential unit having a first gear driven by said first output shaft, a second gear driving said second output shaft, a third gear meshed with said first and second gears, and a carrier rotatably supporting said third gear;
   a worm gearset having a worm gear fixed for rotation with said carrier, and a worm meshed with said worm gear; and
   a motor operable for driving said worm, wherein a locked four-wheel drive mode is established when said worm gearset is held against rotation, and an on-demand four-wheel drive mode is established for varying the drive torque transferred from said first output shaft to said second output shaft when said motor is actuated to vary the rotary speed of said carrier relative to said first output shaft.

3. The transfer case of claim 2 wherein said third gear has a first gear segment meshed with said first gear and a second gear segment meshed with said second gear.

4. The transfer case of claim 2 wherein said worm gearset is self-locking such that said carrier is held against rotation until said worm gearset is rotatably driven by said motor.

5. The transfer case of claim 2 further comprising:
   sensors for sensing operational characteristics of the motor vehicle; and
   a controller for controlling variable actuation of said motor in response to sensor signals from said sensors.

6. A transfer case for use in a four-wheel drive vehicle having a powertrain and first and second drivelines, comprising:
   a first output shaft adapted to transmit drive torque from the powertrain to the first driveline;
   a second output shaft adapted to transmit drive torque to the second driveline;
   a bevel differential unit having a first side gear driven by said first output shaft, a second side gear driving said second output shaft, pinion gears meshed with said first and second side gears, and carrier rotatably supporting said pinion gears;
   a worm gearset having a worm gear fixed for rotation with said carrier and a worm meshed with said worm gear; and
   a motor operable to drive said worm, wherein a locked four-wheel drive mode is established when said worm gearset is held against rotation, and wherein an on-demand four-wheel drive mode is established when said motor is actuated to vary the rotary speed of said carrier relative to said first output shaft.

7. The transfer case of claim 6 wherein said worm gearset is self-locking such that said carrier is held against rotation until said worm gearset is rotatably driven by said motor.

8. The transfer case of claim 6 further comprising:
   sensors for sensing operational characteristics of the four-wheel drive vehicle;
   a controller for controlling variable actuation of said motor in response to sensor signals from said sensors; and a mode selector for permitting selection of said locked four-wheel drive mode and said on-demand four-wheel drive mode, said mode selector operable for sending a mode signal indicative of the specific drive mode selected to said controller, whereby said motor is non-actuated and said worm gearset is held stationary when said locked four-wheel drive mode is selected, and whereby said motor is variable actuated in response to said sensor signals to vary the rotary speed of said carrier relative to said first output shaft for continuously varying the torque transmitted to said second output shaft when said on-demand four-wheel drive mode is selected.

9. A transfer case for use in a four-wheel drive vehicle having a powertrain and first and second drivelines, comprising:

a first output shaft adapted to transmit drive torque from the powertrain to the first driveline;

a second output shaft adapted to transmit drive torque to the second driveline;

a geared differential unit having a first gear driven by said first output shaft, a second gear driving said second output shaft, a third gear meshed with said first and second gears, and a carrier rotatably supporting said third gear;

a worm gearset having a worm that is meshed with an enveloping worm gear fixed for rotation with said carrier, said worm gear having less than twenty-four teeth; and a motor operable for driving said worm.

10. The transfer case of claim 9 further comprising a control system for controlling variable speed actuation of said motor to vary the relative speed between said first output shaft and said carrier for controlling the drive torque transmitted to said second output shaft.

11. The transfer case of claim 10 wherein a locked four-wheel drive mode is established when said worm gearset is held against rotation, and wherein an on-demand four-wheel drive mode is established when said motor is actuated to vary the rotary speed of said carrier relative to said first output shaft.

12. The transfer case of claim 9 wherein said worm gear is self-locking such that said carrier is held against rotation until said worm gearset is rotatably driven by said motor.

13. The transfer case of claim 9 wherein said geared differential unit is a bevel gearset having a first side gear as said first gear, a second side gear as said second gear, and a pinion gear as said third gear.

14. The transfer case of claim 9 wherein said geared differential unit is a planetary gearset having a first sun gear as said first gear, a second sun gear as said second gear, and a planet gear as said third gear.

15. A power transfer assembly for use in a four-wheel vehicle having a powertrain and a first and second drivelines, comprising:

a first output shaft adapted to transmit drive torque from the powertrain to the first driveline;

a second output shaft adapted to transmit drive torque to the second driveline;

a reduction unit having an input gear driven by said first output shaft, an output gear driving said second output shaft, a reaction gear meshed with said input gear and output gear, and a carrier rotatably supporting said reaction gear;

a bi-directionally driveable worm gearset having a worm gear fixed for rotation with said carrier and a worm meshed with said worm gear; and a motor operable for driving said worm to vary the relative speed between said first output shaft and said carrier for controlling the drive torque transmitted from said input gear to said output gear.

16. The power transfer assembly of claim 15 wherein a locked four-wheel drive mode is established when said worm gearset is held against rotation, and wherein an on-demand four-wheel drive mode is established for continuously varying the torque transferred to said second output shaft when said motor is actuated to vary the rotary speed of said carrier relative to said first output shaft.

17. The power transfer assembly of claim 15 wherein said worm gear is an enveloping worm gear having less than twenty-four teeth.

* * * * *